(12) United States Patent
Yamashita et al.

(10) Patent No.: US 7,265,466 B2
(45) Date of Patent: Sep. 4, 2007

(54) ELECTRICAL MOTOR AND FLUID PUMP USING THE SAME

(75) Inventors: Keiichi Yamashita, Kariya (JP); Motoya Ito, Hekinan (JP)

(73) Assignee: Denso Corporation (JP)

( * ) Notice: Subject to any disclaimer, the term of this patent is extended or adjusted under 35 U.S.C. 154(b) by 240 days.

(21) Appl. No.: 11/028,534

(22) Filed: Jan. 5, 2005

(65) Prior Publication Data
US 2005/0151440 A1  Jul. 14, 2005

(30) Foreign Application Priority Data
Jan. 14, 2004 (JP) .............................. 2004-006965

(51) Int. Cl.
*H02K 7/00* (2006.01)
(52) U.S. Cl. ........................................ 310/71; 310/261
(58) Field of Classification Search ................. 310/71, 310/261, 264
See application file for complete search history.

(56) References Cited

U.S. PATENT DOCUMENTS

| | | | |
|---|---|---|---|
| 2,468,187 A | 4/1949 | Erickson | |
| 4,323,805 A | 4/1982 | Caby | |
| 4,433,263 A | 2/1984 | Longhouse | |
| 4,574,212 A | 3/1986 | Haijkens | |
| 5,157,299 A | 10/1992 | Gerlach | |
| 5,607,293 A | 3/1997 | Luedtke | |
| 5,679,996 A | 10/1997 | Strobl | |
| 5,912,523 A | 6/1999 | Ziegler et al. | |
| 5,925,962 A | 7/1999 | Kobman | |
| 5,932,949 A | 8/1999 | Ziegler et al. | |
| 5,955,812 A | 9/1999 | Warner | |
| 6,157,110 A * | 12/2000 | Strobl | ........................ 310/261 |
| 6,259,183 B1 | 7/2001 | Hotta | |
| 6,541,889 B2 | 4/2003 | Moroto et al. | |

(Continued)

FOREIGN PATENT DOCUMENTS

JP  7-161428  6/1995

(Continued)

OTHER PUBLICATIONS

Chinese Official Action dated Sep. 15, 2006 issued in corresponding Chinese Appln. No. 200510004602.5 with English translation.

(Continued)

*Primary Examiner*—Dang Le
(74) *Attorney, Agent, or Firm*—Nixon & Vanderhye PC (57) ABSTRACT

An electrical motor includes a commutator attached to one side of an armature in an axial direction, and a cover structure member attached to the other side of the armature. The cover structure member includes a cover and plural terminals protruding from an outer peripheral portion of the cover toward the armature. In the electrical motor, by attaching the cover structure member to the armature, the other side of the armature in the axial direction is covered by the cover, and the terminals of the cover structure member are fitted to terminals of coils of the armature. Generally, the cover structure member is made of metal. Therefore, the cover structure member is attached to the armature to have a clearance between a through hole portion of the cover and a shaft, so that the cover is electrically insulated from the shaft.

17 Claims, 8 Drawing Sheets

U.S. PATENT DOCUMENTS

| | | | |
|---|---|---|---|
| 6,580,193 B2 * | 6/2003 | Yoshikawa et al. | 310/215 |
| 6,617,742 B2 * | 9/2003 | Lau | 310/234 |
| 6,833,650 B2 | 12/2004 | Hara | |
| 2004/0150280 A1 | 8/2004 | Moroto et al. | |

FOREIGN PATENT DOCUMENTS

| | | |
|---|---|---|
| JP | 2504042 | 4/1996 |
| WO | WO99/18637 | 4/1999 |

OTHER PUBLICATIONS

U.S. Appl. No. 11/028,558 of Ito et al.; "Commutator, and Electrical Motor and Fluid Pump Using The Same"; filed Jan. 5, 2005.

New U.S. Application of Ito et al.; "Commutator, and Electrical Motor and Fluid Pump Using The Same"; filed Jan. 5, 2005.

Final Official Action dated May 4, 2007 issued in co-pending U.S. Appl. No. 11/028,558.

* cited by examiner

# ELECTRICAL MOTOR AND FLUID PUMP USING THE SAME

CROSS REFERENCE TO RELATED APPLICATION

This application is based on Japanese Patent Application No. 2004-006965 filed on Jan. 14, 2004, the contents of which are incorporated herein by reference.

FIELD OF THE INVENTION

The present invention relates to an electrical motor in which any one side of an armature in an axial direction is covered by a cover, and a fluid pump such as a fuel pump using the electrical motor.

BACKGROUND OF THE INVENTION

A fuel pump includes an electrical motor and a pump portion operated by a rotation drive force of the electrical motor. The fuel pump increases pressure of fuel drawn from a fuel tank and supplies the fuel to a fuel consumption device such as an internal combustion engine.

Generally, the electrical motor includes a rotor rotating around a shaft. Furthermore, the rotor includes an armature having coils, a commutator arranged at one side of the armature in an axial direction, connection terminals electrically connected to the coils at the other side in the axial direction, and a cover for covering the other side of the armature in the axial direction. However, in this fuel pump, because the component number of the rotor is increased, it is difficult to reduce assembling steps of the rotor.

SUMMARY OF THE INVENTION

In view of the above-described problems, it is an object of the present invention to provide an electrical motor which reduces the number of assembling steps of a rotor.

It is another object of the present invention to provide a fluid pump such as a fuel pump using the electrical motor.

According to an aspect of the present invention, an electrical motor includes a magnetic member including a plurality of magnetic poles arranged circumferentially, and a rotor disposed inside the magnetic member to be rotated around a shaft. The rotor includes an armature having a plurality of bobbins arranged in a circumferential direction and coils wound on respective bobbins, a commutator arranged at one side of the armature in an axial direction of the shaft, a connection terminal for electrically connecting the coils with each other, and a cover which covers the other side of the armature in the axial direction. In this rotor, the connection terminal and the cover are constructed to form a structure member through which the connection terminal and the cover are integrally assembled to the armature.

Accordingly, by attaching the structure member to the armature, the electrical connection between the coils on the other side of the armature in the axial direction can be performed through the connection terminal while the other side of the armature in the axial direction can be covered by the cover. That is, both the electrical connection between the coils on the other side of the armature and the assembling operation of the cover to the other side of the armature in the axial direction can be performed by attaching the structure member to the other side of the armature. As a result, the number of assembling steps of the rotor can be reduced. For example, the structure member can be constructed of a single member made of metal.

According to another aspect of the present invention, the cover includes a fitting portion which is fitted to the armature to prevent the cover from being removed from the armature. In this case, an additional member for preventing the cover from being removed from the armature is unnecessary. Therefore, the assembling steps of the armature can be reduced. For example, the fitting portion is a plurality of claws extending from an outer peripheral surface of the cover to a radial outside, and the bobbins have insertion holes into which the claws are fitted while the cover is attached to the armature.

For example, the connection terminal includes a plurality of terminal portions protruding from the cover toward the armature. In this case, the coils on the other side of the armature in the axial direction can be easily electrically connected through the terminal portions.

Preferably, the coils have coil terminals electrically connected to the terminal portions of the connection terminal, at the other side of the armature in the axial direction, and the coil terminals have insertion portions into which the terminal portions of the connection terminal are inserted to be electrically connected. In this case, the coils at the other side of the armature in the axial direction can be readily electrically connected with each other through the terminal portions of the connection terminal.

Alternatively, the coil terminals have insertion portions into which the terminal portions of the connection terminal are fitted to prevent the cover from being removed from the armature after the cover is attached to the armature. In this case, an additional member for preventing the cover from being removed from the armature is unnecessary.

Preferably, the cover is attached to the armature to have a clearance between the cover and the shaft, through which the cover is electrically insulated from the shaft. Therefore, it can prevent a short circuit between the cover and the armature. More preferably, the rotator has an outer surface, and the cover is attached to the armature to be exposed to a part of the outer surface of the rotor. Therefore, heat generated in the rotor can be readily discharged to the outside. Furthermore, the cover can have a plurality of drain holes.

In the present invention, the electrical motor can be suitably used for a fluid pump which generates an intake force for drawing a fluid by a rotation driving force of the electrical motor. The fluid pump includes a pumping portion for pumping the fluid by the drive force of the electrical motor, and a pump casing for accommodating the pumping portion. Furthermore, at least a part of a surface of the pump casing, facing the cover, can be formed of an insulation material, and the cover can be made of metal. For example, the fluid pump is a fuel pump for pumping a fuel in a fuel tank.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Figure 1:
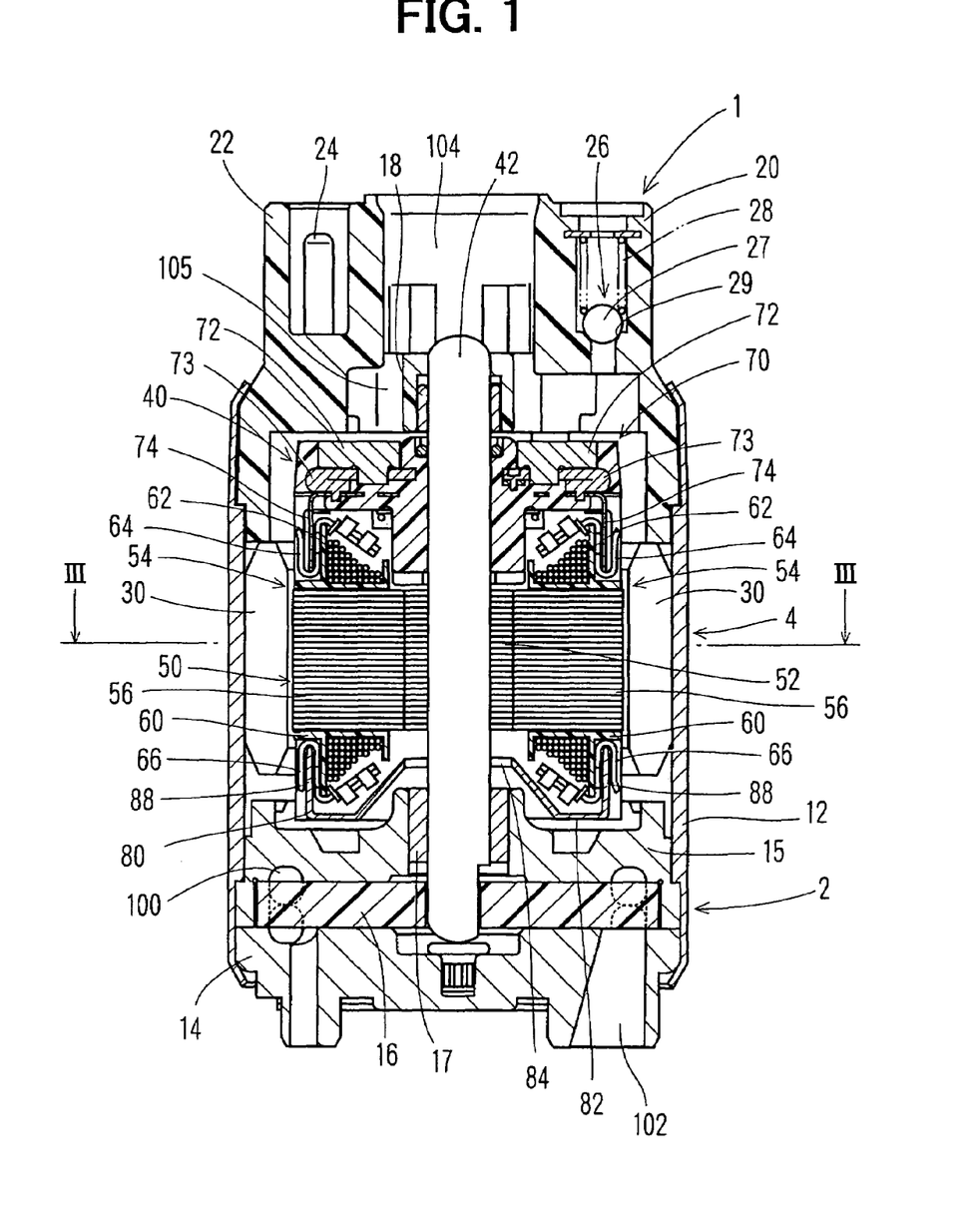
FIG. 1 is a cross-sectional view showing a fuel pump according to a preferred embodiment of the present invention.

A preferred embodiment of the present invention will be now described with reference to the accompanying drawings. FIG. 1 shows a fuel pump 1 having a rotor 40 of an electrical motor 4 of the present invention. For example, the fuel pump 1 is an in-tank pump that is mounted in a fuel tank of a vehicle to supply fuel in the fuel tank to a fuel consumption system such as an engine. The fuel pump 1 includes a pump portion 2 for increasing pressure of a drawn fuel, and the electrical motor 4 for driving the pump portion 2 by rotating the rotor 40 around a shaft 42. The pump portion 2 includes an intake side cover 14, an impeller casing 15 and a circular impeller 16. The electrical motor 4 is constructed with a direct current motor, and is provided with permanent magnets 30 and the rotor 40.

A housing 12 of the fuel pump 1 fastens the intake side cover 14 and a discharge side cover 20, which are disposed at two end sides of the shaft 42 of the rotor 40. The intake side cover 14 and the impeller casing 15 are used as a pump casing, and are disposed to accommodate the impeller 16. A C-shaped pump passage 100 is formed between the intake side cover 14 and the impeller casing 15. The impeller casing 15 is disposed opposite to the rotor 40 in an axial direction of the shaft 42, and supports a bearing member 17 at an inner peripheral side of the impeller casing 15.

Multiple impeller grooves are formed on an outer periphery of the circular impeller 16. When the impeller 16 rotates together with the shaft 42 by the rotation of the rotor 40, a pressure differential is generated at front and back of the impeller groove of the impeller 16 due to a fluid frictional force. By repeating this operation at the multiple impeller grooves, the fuel in the pump passage 100 is pressurized. The fuel in the fuel tank is drawn into the fuel passage 100 from a fuel intake port 102 formed in the intake side cover 14, and is discharged from the impeller casing 15 to a side of a cover structure member 80. A commutator 70 is arranged at one side of the armature 50 in the axial direction. The cover structure member 80 is formed into a single member from a metal, and is positioned opposite to the commutator 70 of the rotor 40 with respect to the armature 50 in the axial direction. The fuel from the cover structure member 80 flows toward the commutator 70 through an outer periphery of the rotor 40, and flows to a fuel discharge port 104 through communication paths 105 that are provided in the discharge side cover 20 at four points to enclose the periphery of the shaft 42. Then, the fuel is supplied from the fuel pump 1 to the engine through the fuel discharge port 104.

The discharge side cover 20 is made of resin, and is formed to cover the commutator 70 of the electrical motor 4. The fuel discharge port 104 is formed approximately at a center portion of the discharge side cover 20 on the axial line of the shaft 42. A receiving connector 22 is formed at an outer peripheral end portion of the discharge side cover 20, offset from the center portion of the discharge side cover 20. A terminal 24 press-fitted into the discharge side cover 20 is arranged inside the receiving connector 22. A pressure adjustment valve 26 for adjusting the pressure inside the fuel pump 1 is provided within the discharge side cover 20. The pressure adjustment valve 26 includes a ball 27, a spring 28 for biasing the ball 27 at one side, and a valve seat 29 on which the ball 27 can be seated. When the pressure within the fuel pump 1 becomes larger than a predetermined pressure, the ball 27 separates from the valve seat 29 opposite to the biasing force of the spring 28, so that the pressure within the fuel pump 1 is decreased.

Figure 3:
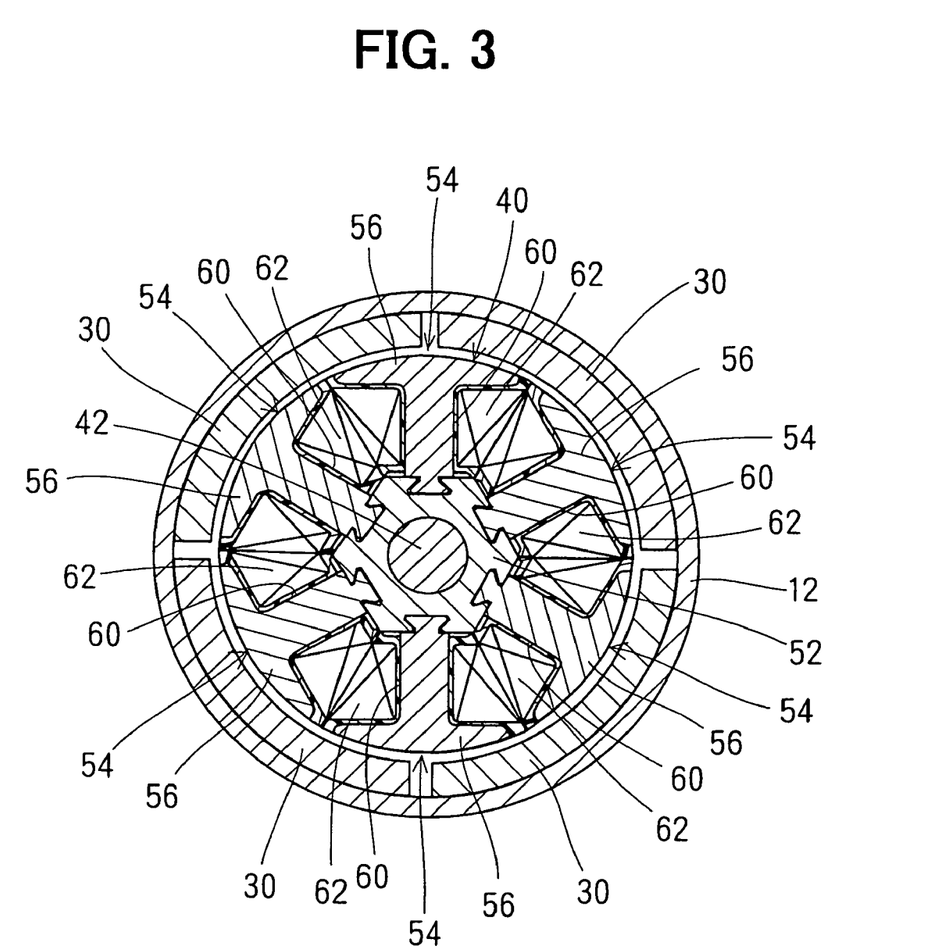
FIG. 3 is a cross-sectional view taken along line III-III in FIG. 1.

Four permanent magnets 30 each of which is formed in a quarter circular arc shape are arranged in a circumferential direction, and are attached to an inner peripheral wall of the housing 12 (FIG. 3). The permanent magnets 30 are constructed with four magnetic poles having different poles in the rotational direction.

Figure 2A:
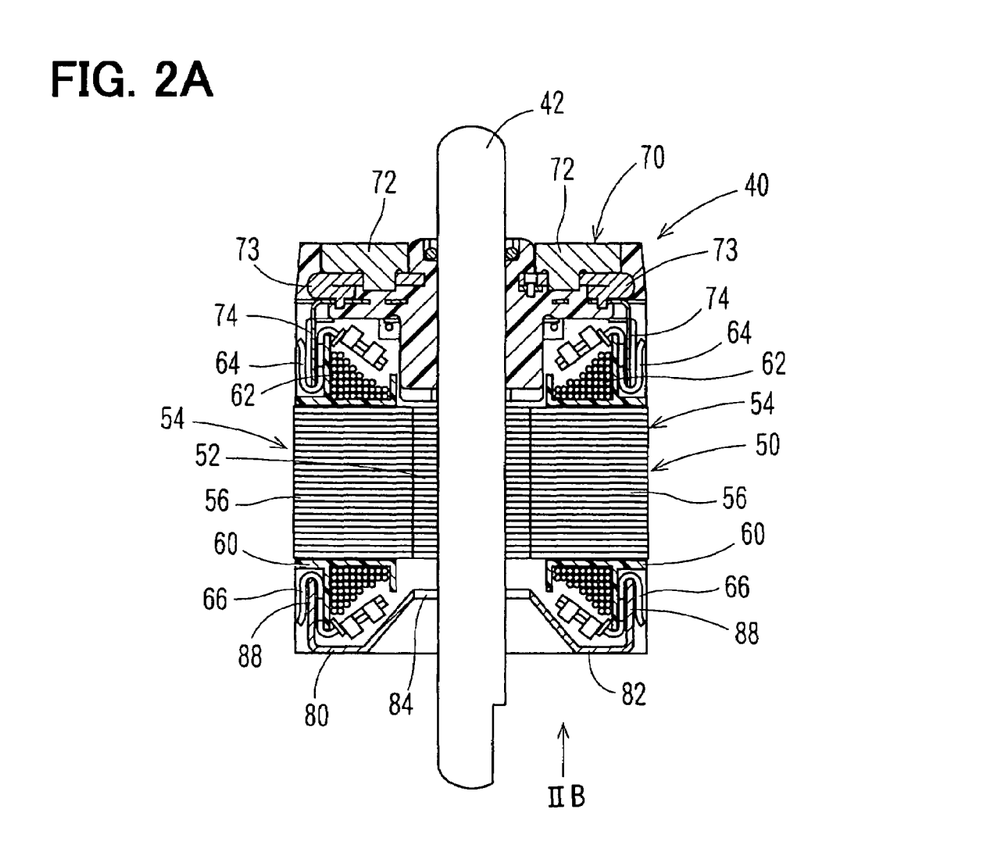
FIG. 2A is a cross-sectional view showing a rotor in the fuel pump.

As shown in FIG. 2A, the rotor 40 includes an armature 50, the commutator 70 and the cover structure member 80. The commutator 70 is disposed at one side of the armature 50 in the axial direction, and the cover structure member 80 is disposed to cover the other side of the armature 5 in the axial direction opposite to the commutator 70. Further, as shown in FIG. 1, the shaft 42 of the rotor 40 is rotatably supported in bearing members 17, 18, which are supported in the impeller casing 15 and the discharge side cover 20, respectively.

As shown in FIG. 3, the armature 50 has a center core 52 at its rotation center portion, and the shaft 42 is press-fitted into the center core 52. Plural magnetic pole coil portions 54 (e.g., six magnetic pole coil portions) are arranged in the rotational direction at an outer periphery of the center core 52 to be connected to the center core 52. Each of the magnetic pole coil portions 54 includes a coil core 56, a bobbin 60 and a coil 62. Each coil 62 is formed by collectively winding wires on the bobbin 60. In this embodiment, the six magnetic pole coil portions 54 have the same structure.

Furthermore, an end portion of each coil 62 at a side of the commutator 70 is electrically connected to a coil terminal 64. Because the coil terminals 64 are positioned slightly inside an outer peripheral surface of the armature 50, it can prevent resistance to the fuel flowing on the outer periphery of the armature 50 from being increased due to the arrangement of the coil terminals 64. The coil terminals 64 contact terminals 74 of the commutator 70 to be electrically connected to the terminals 74. End portions of the coils 62 at the side of the cover structure member 80 are electrically connected to six terminals 66 that are arranged continuously in the rotation direction. Furthermore, the six terminals 66 are electrically connected to the cover structure member 80 so that the coils are electrically connected with each other.

The commutator 70 is an integrally formed cassette type. The commutator 70 has plural segments 72 (e.g., six segments in this embodiment) arranged in the rotational direction. For example, the segments 72 are formed of carbon. Segments 72 adjacent to each other in the rotational direction are electrically insulated from each other. The segments 72 are electrically connected to the terminals 74 through middle terminals 73, so that the segments 72 are electrically connected with each other. By the rotation of the armature 50, the respective segments 72 contact a brush (not shown) in order.

In this embodiment, the middle terminals 73 and the terminals 74 construct segment terminals of the present invention. Furthermore, the segments 72, the middle terminals 73 and the terminals 74 can be supported by a resin material.

Figure 4A:
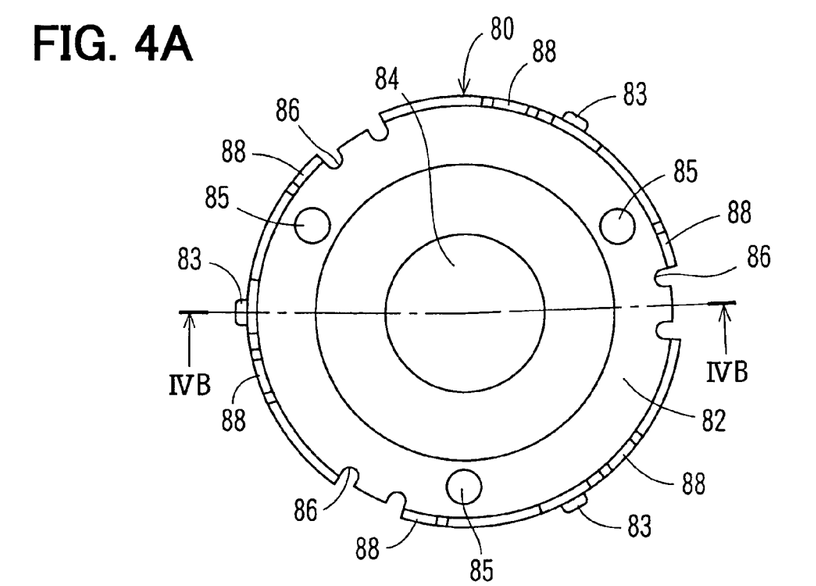
FIG. 4A is a plan view of a cover structure member when being viewed from a side of an armature according to the preferred embodiment.
Figure 4B:
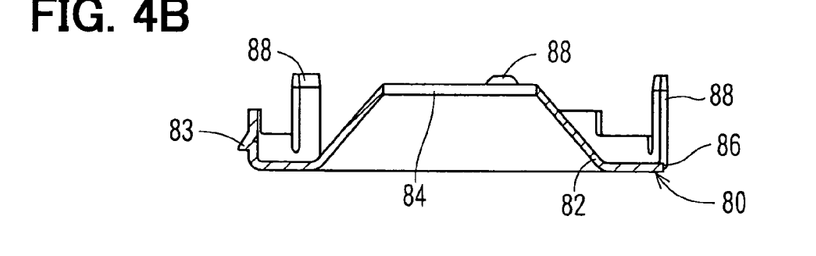
FIG. 4B is a cross-sectional view taken along line IVB-IVB in FIG. 4A.
Figure 5:
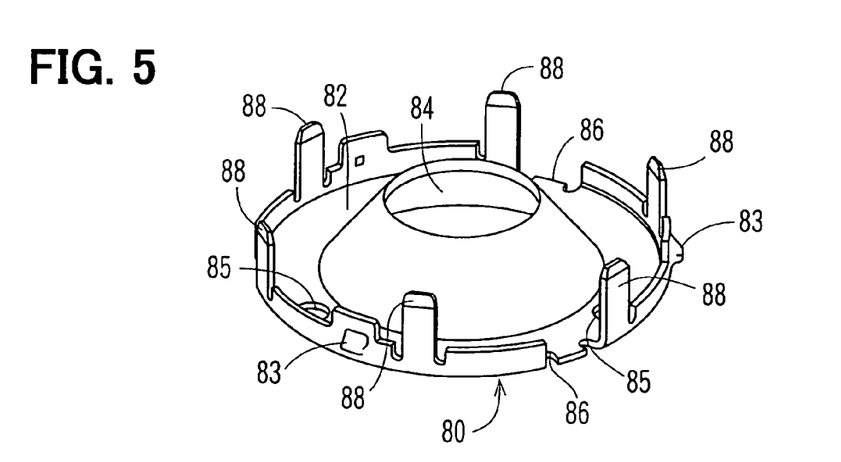
FIG. 5 is a perspective view of the cover structure member when being viewed from the side of an armature.

As shown in FIGS. 4A, 4B and 5, the cover structure member 80 includes a circular cover 82 and plural terminals 88 (e.g., six terminals in this embodiment). The cover structure member 80 is formed into a single member from a metal material plated with tin on brass. Brass has a high electrical conductivity while having a low price, and tin has an antirust property. However, the cover structure member 80 can be formed from the other metal material.

Figure 6:
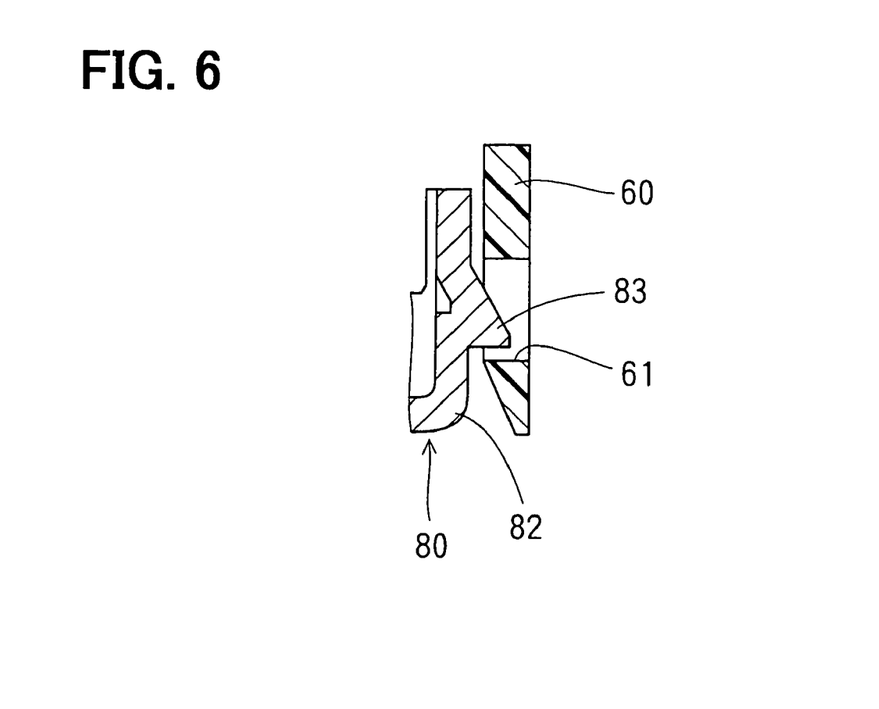
FIG. 6 is a cross-sectional view showing an assembling state between the cover structure member and the armature, according to the preferred embodiment.

The cover 82 has plural claws (e.g., three claws) arranged at the same interval in a circumferential direction of the cover 82 to protrude from an outer peripheral surface of the cover 82 to a radial outside. Each of the claws 83 is fitted into an insertion hole portion 61 formed in a side wall of the bobbin 60 as shown in FIG. 6, so that it can prevent the cover structure member 80 from being removed from the armature 50. For example, each insertion hole portion 61 is a through hole formed to penetrate through the side wall of the bobbin 60.

Figure 2B:
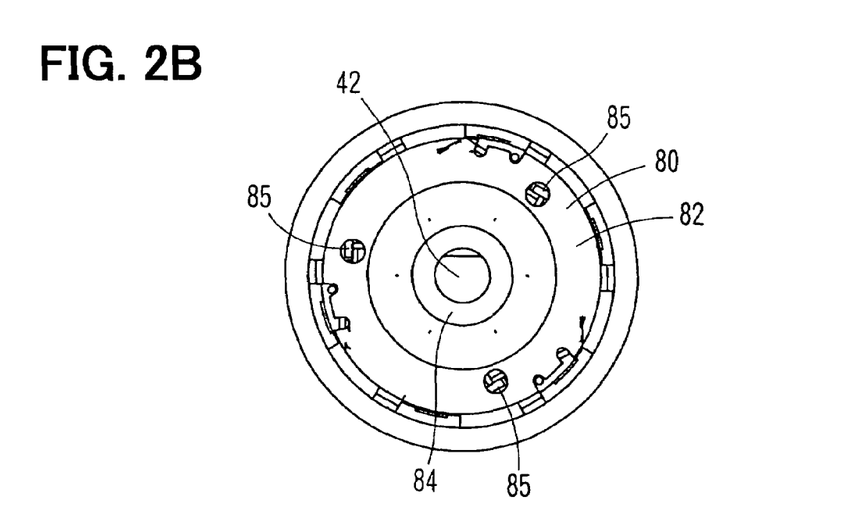
FIG. 2B is a side view when being viewed from arrow IIB in FIG. 2A

As shown in FIGS. 4A, 4B and 5, a center portion of the cover 82 is recessed from an outer peripheral portion toward the armature 50, in order to receive a part of a center portion of the impeller casing 15. A through hole 84 for inserting the shaft 42 is formed in the center portion of the cover 82. Furthermore, as shown in FIGS. 2A and 2B, a clearance is provided for electrically insulating the cover structure member 80 and the shaft 42 from each other, between the cover 82 having the through hole 84 and the outer peripheral surface of the shaft 42. Plural drain holes 85 are formed in a bottom portion of the cover 82 so that water staying in the cover structure member 80 is discharged from the drain holes 85. In addition, recess portions 86 are formed at the outer peripheral edge of the cover 82 as shown in FIG. 4, so that water staying in the cover structure member 80 also can be readily discharged through the recess portions 86.

Figure 7:
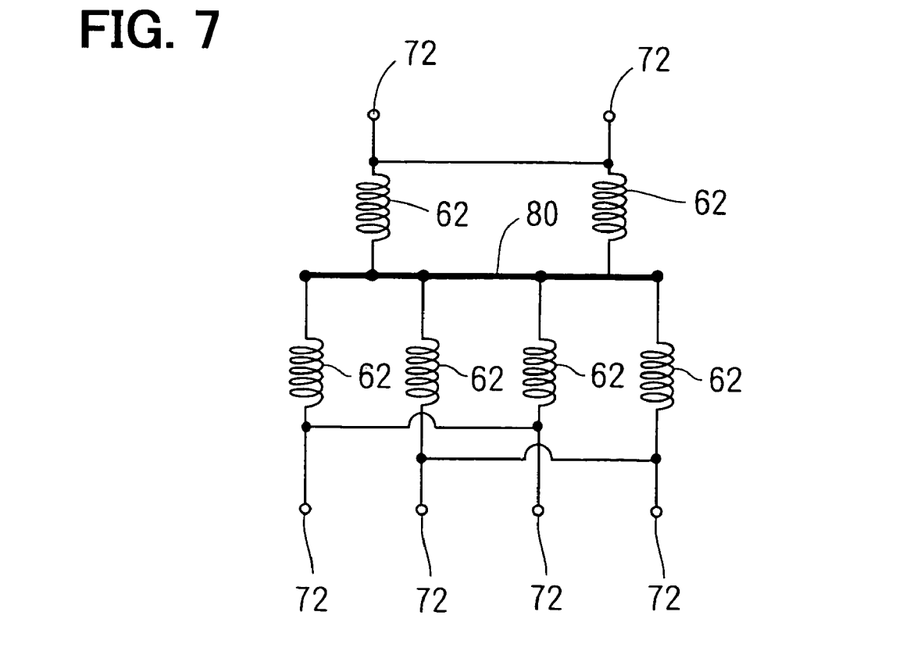
FIG. 7 is a circuit diagram showing a connection state of coils of the armature according to the preferred embodiment.

The six terminals 88 are arranged at six positions in the circumferential direction of the cover 82 to protrude from an outer peripheral side of the cover 82 toward the armature 50. The six terminals 88 are electrically connected with each other through the cover 82. The terminals 88 of the cover structure member 80 are fitted into the terminals 66 of the armature 50, so that end portions of the coils 62 on the side of the cover structure member 80 are electrically connected with each other as shown in FIG. 7. Furthermore, because the segments 72 are electrically connected with each other through terminals 73, 74, the end portions of the coils 62 on the side of the commutator 70 are also electrically connected with each other as shown in FIG. 7.

For example, each terminal 88 of the cover structure member 80 protrudes to the side of the commutator 70, and each terminal 66 of the armature 50 has an insertion portion. In this case, by inserting the terminals 88 of the cover structure member 80 into the insertion portions of the terminals 66 of the armature 50, the end portions of the coils 62 on the side of the cover structure member 80 can be readily electrically connected with each other.

Figure 8:
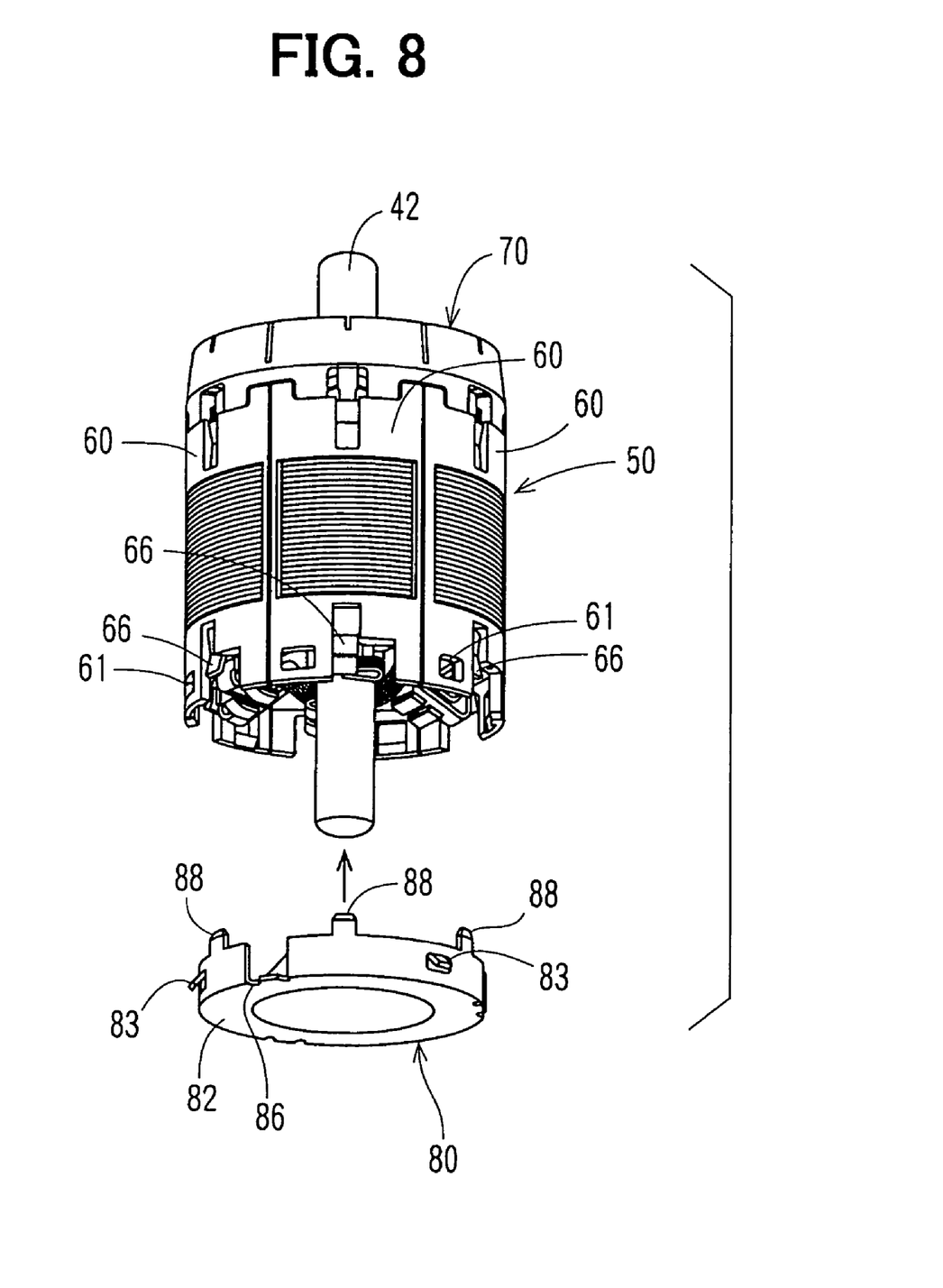
FIG. 8 is a disassembled perspective view showing an assembling state between the armature and the cover structure member according to the preferred embodiment.

In this embodiment, as shown in FIG. 8, by attaching the cover structure member 80 to the armature 50 in the axial direction, the other side of the armature 50 opposite to the commutator 70 is covered by the cover 82, the terminals 66 of the coils 62 of the armature 50 are electrically connected to the terminals 88, and the claws 83 are fitted to the insertion hole portions 61 of the bobbins 60 of the armature 50. Furthermore, the cover 82 for covering the other side of the armature 50 in the axial direction and the connection terminals for electrically connecting the coils 62 with each other are formed into a single metal member. Therefore, the number of components of the rotor 40 can be reduced, and assembling steps of the rotor 40 can be reduced. Here, the connection terminals of the cover structure member 80 can be constructed with a part of the cover 82 and the terminals 88.

In this embodiment, the terminals 88 protrude toward the terminals 66 of the coils 62 of the armature 50 from the cover 82 in an assembling direction where the cover structure member 80 is assembled to be attached to the armature 50. Therefore, while the cover 82 is assembled to the armature 50, the terminals 88 are inserted into the insertion portions of the terminals 66 of the coils 62 to be electrically connected to the terminals 66. As a result, the assembling steps of the rotor 40 can be effectively reduced.

Further, because the claws 83 integrally provided with the cover 82 are fitted to the insertion hole portions 61 of the armature 50, it can prevent the cover structure member 80 from being removed from the armature 50 after assembling. Therefore, it is unnecessary to provide an additional member for preventing the cover structure member 80 from being removed from the armature 50 after the assembling.

Furthermore, because the impeller casing 15 opposite to the cover structure member 80 is formed from an insulation resin, it can prevent an electrical discharge from being generated between the cover structure member 80 and the impeller casing 15, that is, between the rotor 40 and the pump portion 2.

Figure 9A:
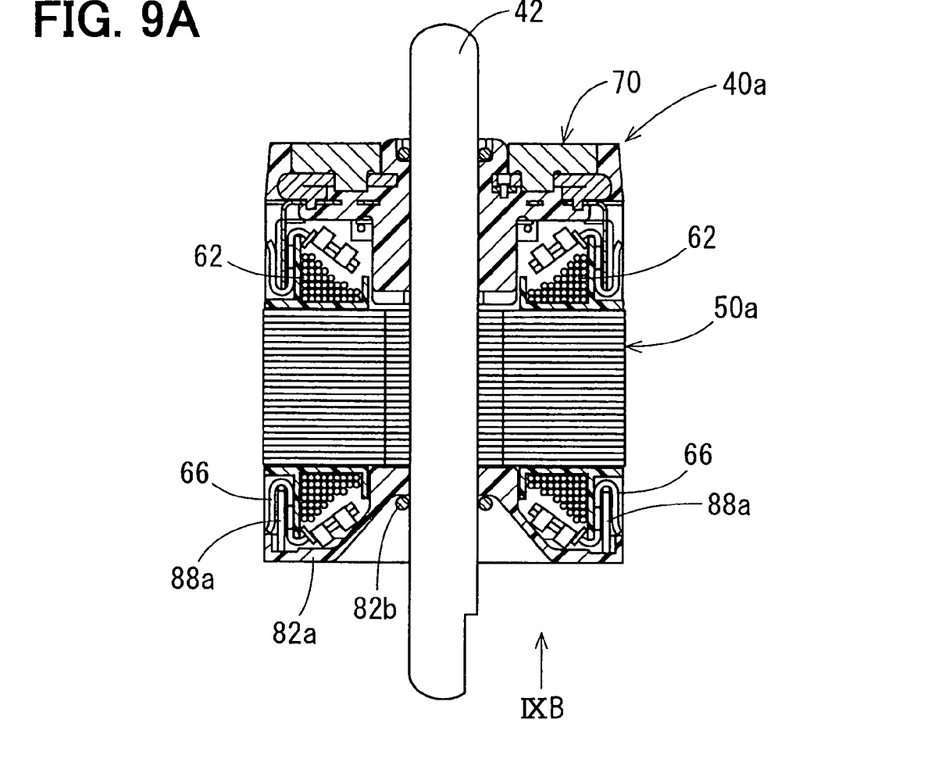
FIG. 9A is a cross-sectional view showing a rotor of a comparison example.
Figure 9B:
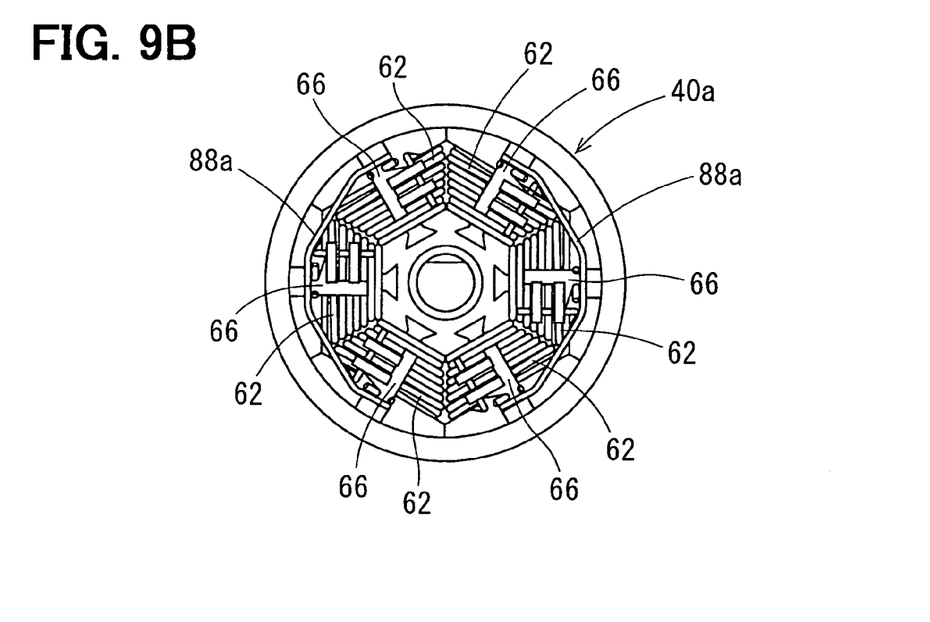
FIG. 9B is a side view of the rotor when being viewed from IXB in FIG. 9A after a cover is removed in the comparison example.
Figure 10:
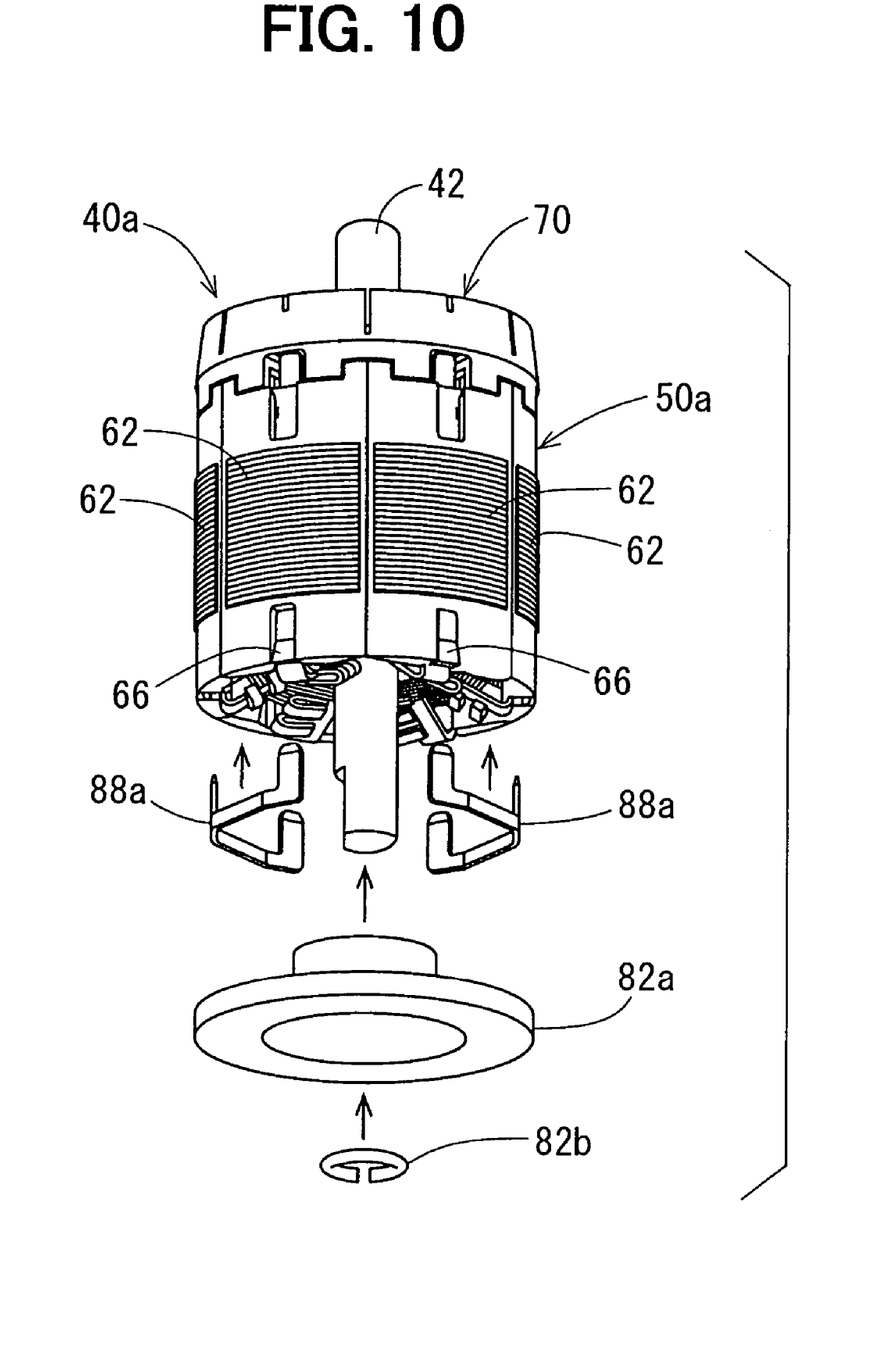
FIG. 10 is a disassembled perspective view showing an assembling state of the rotor in the comparison example.

FIGS. 9A, 9B and 10 show a rotor 40a in a comparison example performed by the inventors of the present application. The rotor 40a includes an armature 50a, the commutator 70 arranged at one side of the armature 50a in the axial direction, and a cover 82a arranged at the other end side of the armature 50 in the axial direction. FIG. 9B shows the armature 50a after removing the cover 82a when being viewed from the side of the cover 82a.

Further, in the comparison example, two connection terminals 88a are provided in the cover 82a, and each of the connection terminals 88a is electrically connected to three terminals 66 of the coils 62 at the other side of the armature 50a in the axial direction. The cover 82a covers the other side of the armature 50 in the axial direction, and a C-ring 82b is press-fitted to the shaft 42 so that it can prevent the cover 82a from being removed from the shaft 42.

In the rotor 40a of this comparison example, the connection terminals 88a and the cover 82a are constructed with separation members separated from each other as shown in FIG. 10. Therefore, the connection terminals 88 and the cover 82a are respectively separately attached to the armature 50a. As a result, the assembling number of the rotor 40a increases. Furthermore, because the cover 82a and the C-ring 82b for preventing a removing of the cover 82a are separate members separated from each other, it is also necessary to respectively separately assemble the cover 82a and the C-ring 82b to the armature 50. Accordingly, in the comparison example, the assembling steps of the rotor 40*a* increase compared with the above-described preferred embodiment.

In the above-described preferred embodiment, the connection terminals constructed with the terminals 84 and a part of the cover 82 are integrated with the cover 82 so as to form the cover structure member 80. Therefore, the electrical connection between the connection terminals and the coils 62 at the other end side of the armature 50 in the axial direction and attachment operation covering the armature 50 at the other end side in the axial direction can be performed by using the single cover structure member 80. Accordingly, the assembling steps of the rotor 40 can be reduced compared with the comparison example.

Further, in the above-described embodiment, the claws 83 are integrally provided with the cover 82, and the claws 83 are fitted into the insertion hole portions 61 of the bobbins 60 to prevent the cover structure member 80 from being separated from the armature 50 after the cover structure member 80 is attached to the armature 80. Accordingly, the cover 82 can be tightly fitted to the armature 50 without using an additional fastening member such as the C-ring 82*b* of the comparison example.

Although the present invention has been fully described in connection with the preferred embodiment thereof with reference to the accompanying drawings, it is to be noted that various changes and modifications will become apparent to those skilled in the art.

For example, in the above-described embodiment, the cover structure member 80 having the cover 82 and the terminals 88 is formed from a single metal member. However, the cover structure member 80 can be integrally formed by connecting the cover 82 and the terminals 88 formed separately from a metal material. In this case, the cover 82 and the terminals 88 are connected by welding to form the integrated cover structure member 80.

In the comparison example shown in FIGS. 9A, 9B and 10, the metal connection terminals 88*a* can be formed by insert-molding in the resinous cover 82*a* so that an integrated structure where the cover 82*a* and the connection terminals 88*a* are integrated can be formed, as a modification of the present invention.

In the above-described embodiment, the claws 83 provided in the cover 82 are fitted to the insertion hole portions 61 of the bobbins 60 so that it can prevent the cover structure member 80 having the cover 82 from being separated from the armature 50. However, as in the rotor 40*a* shown in FIGS. 9A, 9B and 10, a C-ring can be used in order to prevent the cover structure member 80 (cover 82) from being separated from the armature 50 in the present invention. Further, when the terminals 88 of the cover structure member 80 are tightly fitted into the insertion portions of the terminals 66 of the armature 50, it can prevent the cover structure member 80 (cover 82) from being removed from the armature 50.

The whole of impeller casing 15 is not necessarily made of the insulation resin material. For example, only a part of the impeller casing 15 opposite to the cover structure member 80 can be formed by an insulation material. Further, an insulation material can be fitted between the through hole 84 provided in the cover structure member 80 and the shaft 42, so as to electrically insulate the cover structure member 80 from the shaft 42.

Furthermore, the present invention can be applied to an electrical motor for another use, without being limited to the fuel pump. For example, the electrical motor of the present invention can be suitably used for a fluid pump for pumping a fluid.

Such changes and modifications are to be understood as being within the scope of the present invention as defined by the appended claims.

What is claimed is:

1. An electrical motor comprising:
   a magnetic member including a plurality of magnetic poles arranged circumferentially; and
   a rotor disposed inside the magnetic member to be rotated around a shaft, the rotor including
      an armature having a plurality of bobbins arranged in a circumferential direction, and coils wound on respective bobbins,
      a commutator having a plurality of segments electrically connected to the coils, the commutator arranged at one side of the armature in an axial direction of the shaft,
      a connection terminal for electrically connecting the coils with each other, and
      a cover which covers the other side of the armature in the axial direction,
   wherein the connection terminal and the cover are constructed to form a structure member through which the connection terminal and the cover are integrally assembled to the armature, and
   wherein the structure member is a single member made of metal.

2. The armature according to claim 1, wherein the connection terminal includes a plurality of terminal portions protruding from the cover toward the armature.

3. The armature according to claim 1, wherein the cover has a fitting portion which is fitted to the armature to prevent the cover from being removed from the armature.

4. The electrical motor according to claim 1, wherein the connection terminal includes a plurality of terminal portions protruding from an outer peripheral portion of the cover toward the armature.

5. The electrical motor according to claim 4, wherein:
   the coils have coil terminals electrically connected to the terminal portions of the connection terminal, at the other side of the armature in the axial direction; and
   the coil terminals have insertion portions into which the terminal portions of the connection terminal are inserted to be electrically connected.

6. The electrical motor according to claim 4, wherein:
   the coils have coil terminals electrically connected to the terminal portions of the connection terminal, at the other side of the armature in the axial direction; and
   the coil terminals have insertion portions into which the terminal portions of the connection terminal are fitted to prevent the cover from being removed from the armature after the cover is attached to the armature.

7. The electrical motor according to claim 1, wherein the cover is made of metal.

8. The electrical motor according to claim 7, wherein the rotator has an outer surface, and the cover is attached to the armature to be exposed to a part of the outer surface of the rotor.

9. The electrical motor according to claim 1, wherein the cover is attached to the armature to have a clearance between the cover and the shaft, through which the cover is electrically insulated from the shaft.

10. The electrical motor according to claim 1, wherein the cover has a plurality of drain holes.

11. The electrical motor according to claim 1, wherein the electrical motor is used for a fuel pump which generates an intake force for drawing a fuel in a fuel tank by a rotation driving force of the electrical motor.

12. An electrical motor comprising:
a magnetic member including a plurality of magnetic poles arranged circumferentially; and
a rotor disposed inside the magnetic member to be rotated around a shaft, the rotor including
an armature having a plurality of bobbins arranged in a circumferential direction, and coils wound on respective bobbins.
a commutator having a plurality of segments electrically connected to the coils, the commutator arranged at one side of the armature in an axial direction of the shaft,
a connection terminal for electrically connecting the coils with each other, and
a cover which covers the other side of the armature in the axial direction, wherein:
the connection terminal and the cover are constructed to form a structure member through which the connection terminal and the cover are integrally assembled to the armature,
the cover has a fitting portion which is fitted to the armature to prevent the cover from being removed from the armature,
the fitting portion is a plurality of claws extending from an outer peripheral surface of the cover to a radial outside; and
the bobbins have insertion holes into which the claws are fitted while the cover is attached to the armature.

13. An electrical motor comprising:
a magnetic member including a plurality of magnetic poles arranged circumferentially; and
a rotor disposed inside the magnetic member to be rotated around a shaft, the rotor including
an armature having a plurality of bobbins arranged in a circumferential direction, and coils wound on respective bobbins,
a commutator having a plurality of segments electrically connected to the coils, the commutator arranged at one side of the armature in an axial direction of the shaft,
a connection terminal for electrically connecting the coils with each other, and
a cover which covers the other side of the armature in the axial direction,
wherein the cover has a fitting portion which is fitted to the armature to prevent the cover from being removed from the armature, and
wherein the cover is made of metal.

14. The electrical motor according to claim 13, wherein the rotator has an outer surface, and the cover is attached to the armature to be exposed to a part of the outer surface of the rotor.

15. The electrical motor according to claim 13, wherein the cover has a plurality of drain hole.

16. An electrical motor comprising:
a magnetic member including a plurality of magnetic roles arranged circumferentially; and
a rotor disposed inside the magnetic member to be rotated around a shaft, the rotor including
an armature having a plurality of bobbins arranged in a circumferential direction, and coils wound on respective bobbins,
a commutator having a plurality of segments electrically connected to the coils, the commutator arranged at one side of the armature in an axial direction of the shaft,
a connection terminal for electrically connecting the coils with each other, and
a cover which covers the other side of the armature in the axial direction,
wherein the cover has a fitting portion which is fitted to the armature to prevent the cover from being removed from the armature, and
wherein the cover is attached to the armature to have a clearance between the cover and the shaft, through which the cover is electrically insulated from the shaft.

17. A fluid pump for pumping a fluid by using a drive force of an electrical motor, the electrical motor comprising:
a magnetic member including a plurality of magnetic poles arranged circumferentially; and
a rotor disposed inside the magnetic member to be rotated around a shaft, the rotor including
an armature having a plurality of bobbins arranged in a circumferential direction, and coils wound on respective bobbins,
a commutator having a plurality of segments electrically connected to the coils, the commutator arranged at one side of the armature in an axial direction of the shaft,
a connection terminal for electrically connecting the coils with each other, and
a cover which covers the other side of the armature in the axial direction,
wherein the connection terminal and the cover are constructed to form a structure member through which the connection terminal and the cover are integrally assembled to the armature, and further comprising
a pumping portion for pumping the fluid by the drive force of the electrical motor; and
a pump casing for accommodating the pumping portion, wherein:
at least a part of a surface of the pump casing, facing the cover, is formed of an insulation material; and
the cover is made of metal.

* * * * *